United States Patent [19]

Kumada et al.

[11] Patent Number: 5,083,460

[45] Date of Patent: Jan. 28, 1992

[54] LEVEL SENSOR

[75] Inventors: Akira Kumada; Kenji Matsuo; Chitaka Ochiai, all of Kanagawa, Japan

[73] Assignee: Murata Mfg. Co., Ltd., Nagaokakyo, Japan

[21] Appl. No.: 618,339

[22] Filed: Nov. 26, 1990

[30] Foreign Application Priority Data

Nov. 30, 1989 [JP] Japan .................................. 1-312750

[51] Int. Cl.⁵ ........................ B60Q 1/00; G08B 21/00
[52] U.S. Cl. ......................................... 73/295; 340/620
[58] Field of Search ........................... 73/295; 340/620

[56] References Cited

U.S. PATENT DOCUMENTS

| 2,982,908 | 5/1961 | Erickson et al. | 73/295 |
| 3,790,936 | 2/1974 | Knoll | 340/620 X |
| 4,361,037 | 11/1982 | Hauschild et al. | 73/295 |
| 4,461,175 | 7/1984 | Baumgart et al. | 73/295 |

Primary Examiner—Daniel M. Yasich
Attorney, Agent, or Firm—Jordan and Hamburg

[57] ABSTRACT

A level sensor with an amplifier circuit includes one of the level detection resistor and the temperature compensation resistor as an input resistor or a grounding resistor to the negative input terminal of the operational amplifier, and includes the other resistor as a negative feedback resistor.

9 Claims, 3 Drawing Sheets

LEVEL SENSOR

BACKGROUND OF THE INVENTION

1. Field of the Invention

This invention relates the level sensor, and more particularly to a level sensor for detecting of a level of a liquid or powdered material.

2. Description of the Prior Art

A conventional level sensor comprises level detection resistors, a temperature compensation resistor having the same temperature characteristic as those of the level detection resistors, and two resistance measurement circuits for measuring resistance values of the level detection resistors and the temperature compensation resistor, respectively. In this instance, the temperature compensation resistor is coated with an insulating material in order to allow it to be electrically isolated from the level detection resistors.

In a sensor where the level detection resistors are short-circuited, e.g., by an electrolyte contained in a vessel, when the liquid level changes in a range from the lower end portion of the level detection resistor to the upper end portion thereof, the resistance value outputted from the resistance measurement circuit connected to the level detection resistors changes linearly.

Thus, the liquid level is detected by the resistance value mentioned above.

The slope of the straight line indicating the relation between the resistance value and the liquid level depends on temperature because of the temperature characteristic of the level detection resistor. Namely, the resistance value is changed not only by the liquid level but also by temperature.

In view of this, the conventional level sensor further comprises a computation circuit (or a processor) for reading thereinto a resistance value outputted from the resistance measurement circuit connected to the temperature compensation resistor to perform a temperature compensating operation on the basis of the resistance value thus read thereinto.

However, since the above-mentioned conventional level sensor requires two resistance measurement circuits and a computation circuit (or processor), there was the problem that its construction is complicated, and the cost is increased.

SUMMARY OF THE INVENTION

With the above in mind, an object of this invention is to provide a level sensor which is simple in construction and is inexpensive.

The level sensor of this invention comprises a level detection resistor; a temperature compensation resistor having the same temperature characteristic as that of the level detection resistor; and an amplifier circuit including either the level detection resistor or the temperature compensation resistor as an input resistor or a grounding resistor to the inverting input terminal of an operational amplifier, and including the other of the two resistors as a negative feedback resistor of the operational amplifier.

In the above configuration, the expression "input resistor or grounding resistor" should read "input resistor" when a reference signal inputted to the amplifier circuit is applied to the negative input terminal of the operational amplifier, and should read "grounding resistor" when the reference signal is applied to the positive input terminal thereof. In the former case, the amplifier circuit serves as an inverting amplifier. In the latter case, the amplifier circuit serves as a non-inverting amplifier.

The amplifier circuit includes either the level detection resistor and the temperature compensation resistor as an input resistor or a grounding resistor to the negative input terminal of the operational amplifier, and includes the other resistor as a negative feedback resistor.

The amplification is determined by the ratio between the resistance values of the both resistors. When the level of a liquid or a powdered material changes, the resistance value of the level detection resistor also changes, and the amplification degree changes accordingly.

For this reason, if a reference signal is inputted to the amplifier circuit, the output signal assumes values corresponding to level changes. Thus, level detection can be made.

When there is any temperature change, the resistance value of the level detection resistor changes, but the resistance value of the temperature compensation resistor similarly changes. As described above, since the amplification degree is determined by the ratio between the resistance values of the both resistors, when the resistance values of the to resistors change similarly depending upon temperature, such changes do not appear when viewed in terms of the ratio. Namely, the amplification has no influence on temperature.

Thus, level detection can be made without being affected by temperature changes, by a simple and low cost construction.

DESCRIPTION OF THE PREFERRED EMBODIMENTS

Figure 1:
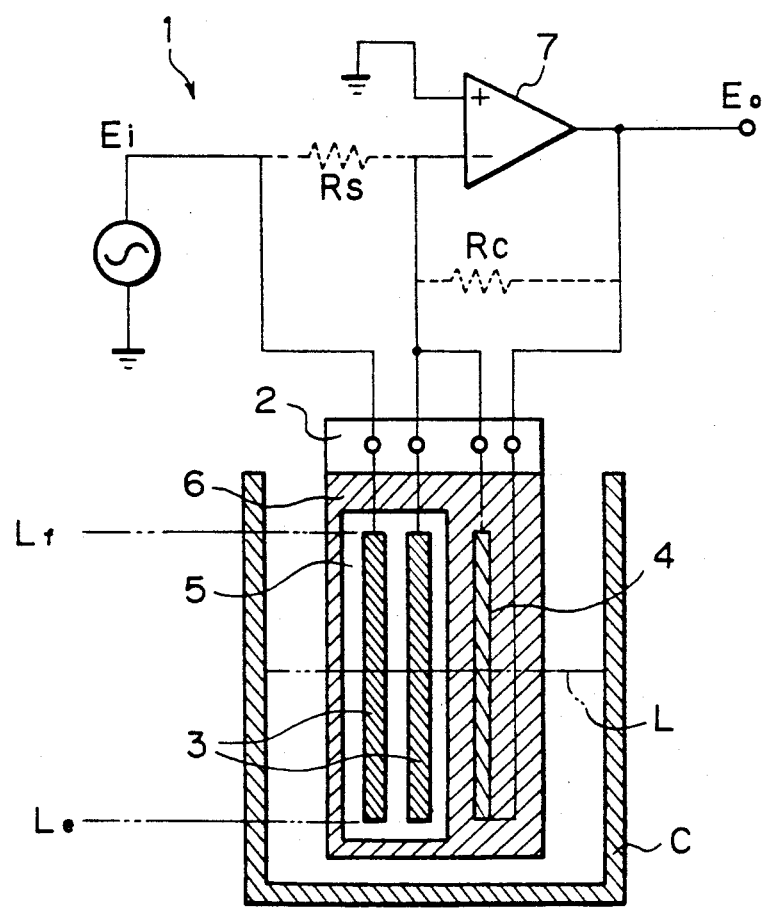
FIG. 1 is an explanatory view showing a circuit configuration of a level sensor of an embodiment according to this invention.

This, invention will now be described in detail in accordance with embodiments shown in the drawings. It is to be noted that this invention is not limited by these embodiments.

FIG. 1 shows a level sensor 1 of one embodiment according to this invention.

In the level sensor 1, the sensor unit includes level detection resistors 3 and a temperature compensation resistor 4 which are formed on the surface of an insulating substrate 2, wherein a portion except for the area 5 including the level detection resistors 3 is coated with an insulating water-proof film 6.

The amplifier unit is comprised of an inverting amplifier having a level detection resistors 3 as an input resistor to the negative input terminal of an operational amplifier 7, and having the temperature compensation resistor 4 as a negative feedback resistor, wherein a reference signal Ei is inputted to the input resistor.

The resistance value RS of the level detection resistor 3 is expressed by the following equation:

$$RS = (1 - \alpha t)(Lf - L)RSo/(Lf - Le) \quad (1)$$

where RSo is the resistance value with the lower end portions of the level detection resistors 3 short-circuited and at a predetermined temperature. $\alpha$ is a temperature coefficient. t is the temperature difference between a temperature at the time of measurement and the predetermined temperature.

On the other hand, the resistance value RC of the temperature compensation resistor 4 is expressed by the following equation:

$$RC = (1 - \alpha t)RCo \quad (2)$$

where RCo is a resistance value at a predetermined temperature. The temperature coefficient $\alpha$ and the temperature difference t are the same as those in the above-mentioned equation (1) because the level detection resistors 3 and the temperature compensation resistor 4 are formed of materials having the same temperature coefficient and are arranged at positions closer to the same substrate 2.

Since the amplification degree of the amplifier unit is expressed as RC/RS, the output voltage Eo is expressed by the following equation:

$$Eo = -Ei(Lf - Le)/(Lf - L) \quad (3)$$

where Ei is the amplitude of the alternating signal applied to the level sensor to measure the liquid level, Eo is the amplitude of the sensor output signal, $L_f$ corresponds to the full resistance, $L_e$ refers to the empty resistance, and L refers to the current measured resistance of the level detection resistors.

Thus, the output voltage Eo is changed only by the liquid level L without being affected by temperature changes.

Figure 2:
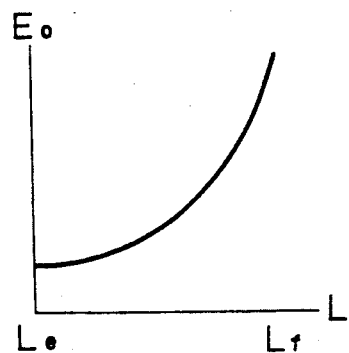
FIG. 2 is a characteristic diagram of the level sensor shown in FIG. 1.

FIG. 2 is a characteristic diagram showing the relationship between the output voltage Eo and the liquid level L. Since this relationship is represented as an inverse proportional curve such that the resolution becomes greater according as the liquid level becomes closer to the upper end Lf of the level detection resistor 3, the level sensor of this structure is suitable for use where the liquid level is maintained at a constant level in the vicinity of the upper end Lf.

As an actual example, the level detection resistor 3 may be a carbon mixed epoxy printed resistor having a width of 5 mm, a length of 300 mm, and a resistance value of 75 KΩ. As another actual example, the temperature compensation resistor 4 may be a carbon mixed epoxy printed resistor having a width of 2.5 mm, a length of 300 mm, and a resistance value of 150 KΩ. In addition, the lead electrode and wiring may be an Ag (silver) mixed epoxy conductive pattern.

Figure 3:
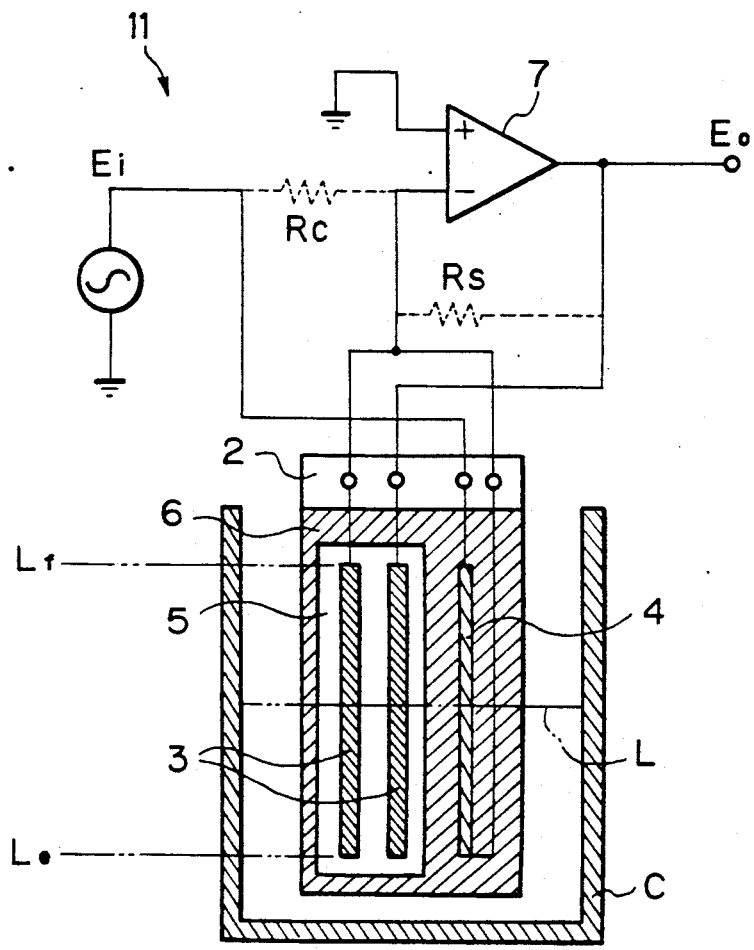
FIG. 3 is an explanatory view showing a circuit configuration of a level sensor of another embodiment according to this invention.

FIG. 3 shows a level sensor 11 of another embodiment according to this invention.

The level sensor 11 of this embodiment differs from the level sensor 1 of the first mentioned embodiment in that the level detection resistors 3 serve as a negative feedback resistor, and the temperature compensation resistor 4 serves as an input resistor. In this case, the following relationship holds:

$$Eo = -Ei(Lf - L)/(Lf - Le) \quad (4)$$

Figure 4:
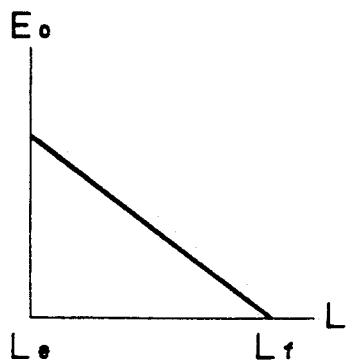
FIG. 4 is a characteristic diagram of the level sensor shown in FIG. 3.

The characteristic as shown in FIG. 4 is provided. Namely, the output voltage Eo and the liquid level L have a linear relationship. Accordingly, the level sensor of this structure is suitable for use when it is required that the resolution is kept constant in a range from the lower end Le to the upper end Lf of the level detection resistor 3.

Figure 5:
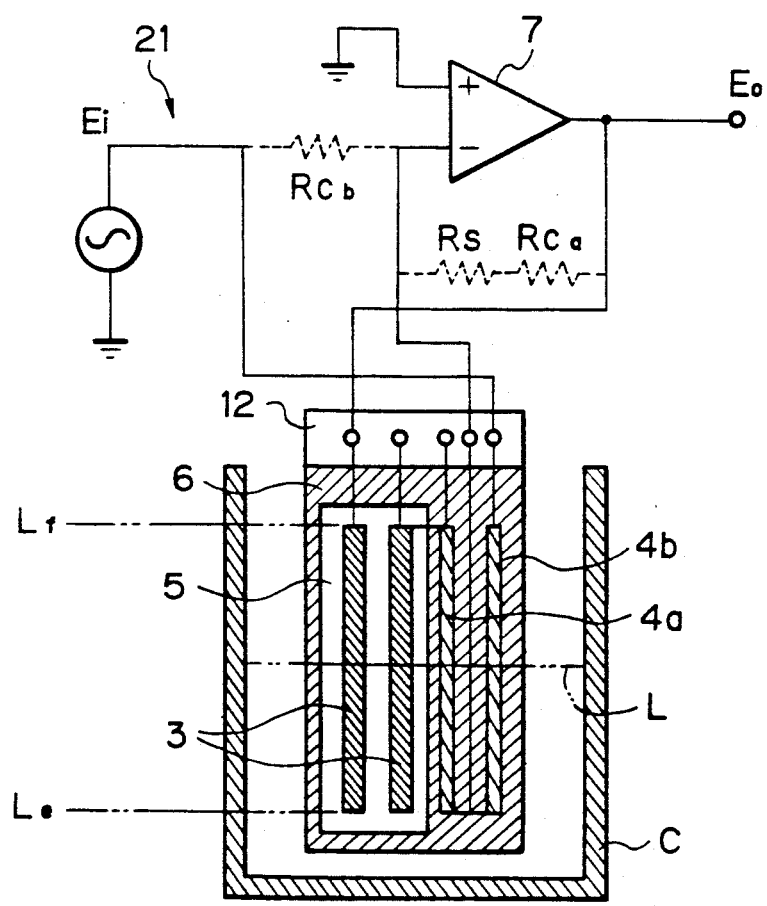
FIG. 5 is an explanatory view showing a circuit configuration of a level sensor of a further embodiment according to this invention.

FIG. 5 shows a level sensor 21 of a further embodiment according to this invention.

In this level sensor 21, two temperature compensation resistors 4a and 4b are formed wherein the level detection resistors 3 and the temperature compensation resistor 4a serve as a negative feedback resistor, and the temperature compensation resistor 4b serves as an input resistor. With this level sensor 21, the width of changes in the output voltage Eo can be easily adjusted.

While an explanation has been given in the above-described embodiments in connection with the case where the amplifier is comprised of an inverting amplifier, this invention can be applied, in a manner similar to the above, to the case where the amplifier unit is comprised of a non-inverting amplifier.

As is understood from the foregoing description, in accordance with the level sensor according to this invention, level detection can be made without being affected by temperature changes, and the level sensor can be constructed simply and at a low cost.

What is claimed is:

1. A level sensor comprising:
    a level detection resistor,
    a temperature compensation resistor having the same temperature characteristic as that of said level detection resistor, and
    an amplifier circuit including one of said level detection resistor and said temperature compensation resistor as an input resistor connected to a negative input terminal of an operational amplifier, and the other of said resistors connected between said negative input terminal and an output terminal as a negative feedback resistor of said operational amplifier, whereby the amplification of said amplifier is determined by the ratio of said resistors.

2. A level sensor as set forth in claim 1, wherein the level detection resistor and the temperature compensation resistor are formed on the surface of an insulating substrate, and wherein a region, except for a partial region including said level detection resistor, including said temperature compensation resistor, is coated with an insulating film.

3. A level sensor comprising:
    a level detection resistor,
    first and second temperature compensation resistors having the same temperature characteristics as that of said level detection resistor, and
    an amplifier circuit wherein a series circuit which is comprised of said level detection resistor and said first temperature compensation resistor comprises an input resistor connected to the negative input terminal of an operational amplifier, and wherein said second temperature compensation resistor comprises a negative feedback resistor of said operational amplifier, whereby the amplification of said amplifier is a function of the ratio of said resistance of said resistors.

4. A level sensor as set forth in claim 3, wherein the level detection resistor and the temperature compensation resistor are formed on the surface of an insulating substrate, and wherein a region, except for a partial region including said level detection resistor, including said temperature compensation resistor, is coated with an insulating film.

5. A level sensor circuit comprising:

a level detection resistance circuit, a temperature compensation resistance circuit, an amplifier having an input, a first circuit connected to said input, an output, and a second circuit connected between said input and output and constituting a negative feedback circuit, whereby the amplification of said amplifier is a function of the ratio of the resistances of said first and second circuits, said level detection resistance circuit being included in one of said first and second circuits, and said temperature compensation resistance circuit being connected in series with the other of said first and second circuits.

6. The level sensor circuit of claim 5 wherein said level detection resistance circuit comprises a level detection resistor, and said temperature compensation resistance circuit comprises a temperature compensation resistor, said level detection resistor and temperature compensation resistor being mounted to be subject to common temperature variations.

7. The level sensor circuit of claim 6 wherein said level detection circuit is connected to said input of said amplifier and said temperature compensation circuit is connected between said input and said output of said amplifier.

8. The level sensor circuit of claim 6 wherein said level detection circuit is connected between said input and said output and said temperature compensation circuit is connected to said input of said amplifier.

9. The level sensor circuit of claim 5 wherein said level detection circuit includes a serially connected temperature compensation resistor.

* * * * *